United States Patent
Kaku

(10) Patent No.: US 12,386,419 B2
(45) Date of Patent: Aug. 12, 2025

(54) REMOTE DIALOGUE SERVICE THAT CONTROLS DISPLAY OF OBJECTS ON SCREEN

(71) Applicant: TOYOTA JIDOSHA KABUSHIKI KAISHA, Toyota (JP)

(72) Inventor: Wataru Kaku, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/465,608

(22) Filed: Sep. 12, 2023

(65) Prior Publication Data
US 2024/0094812 A1 Mar. 21, 2024

(30) Foreign Application Priority Data
Sep. 21, 2022 (JP) ................................. 2022-150732

(51) Int. Cl.
*G06F 3/01* (2006.01)
*H04N 7/15* (2006.01)

(52) U.S. Cl.
CPC ............. *G06F 3/013* (2013.01); *H04N 7/15* (2013.01)

(58) Field of Classification Search
CPC .. G06F 3/01–013; G06F 3/048–04817; H04N 7/14–157; G06T 19/00–20; H04L 12/1813–1831
See application file for complete search history.

(56) References Cited

U.S. PATENT DOCUMENTS

| | | | |
|---|---|---|---|
| 2018/0165887 A1* | 6/2018 | Iwai | A63F 13/86 |
| 2018/0329604 A1* | 11/2018 | Nakabo | H04L 67/131 |
| 2019/0253667 A1* | 8/2019 | Valli | H04N 7/157 |
| 2020/0099891 A1* | 3/2020 | Valli | H04N 13/111 |
| 2021/0084259 A1* | 3/2021 | Kies | G06F 1/1686 |
| 2022/0086203 A1* | 3/2022 | Morris | H04N 7/157 |
| 2022/0232128 A1* | 7/2022 | Glisic | H04M 3/568 |
| 2022/0232191 A1 | 7/2022 | Kawakami et al. | |
| 2022/0277528 A1 | 9/2022 | Funazukuri et al. | |
| 2023/0051409 A1* | 2/2023 | Du | H04N 7/15 |

FOREIGN PATENT DOCUMENTS

| | | |
|---|---|---|
| JP | 2001-136501 A | 5/2001 |
| JP | 2014-225801 A | 12/2014 |
| JP | 2020-88618 A | 6/2020 |

(Continued)

*Primary Examiner* — Keith L Crawley
(74) *Attorney, Agent, or Firm* — Sughrue Mion, PLLC

(57) ABSTRACT

A method performed by a terminal apparatus configured to communicate with a server, the method includes displaying, on a screen, a plurality of objects including first objects indicating faces of other users who are interlocutors of a user of the terminal apparatus, detecting an object on the screen at which the user is gazing, as the user's gaze object, transmitting information indicating the user's gaze object to the server, receiving information indicating each interlocutor's gaze object from the server, and controlling orientation of each of the first objects and arrangement of the plurality of objects so as to satisfy, on the screen, a first condition that each interlocutor's line of sight is directed to the interlocutor's gaze object, and a second condition that there are no objects, in each interlocutor's the line of sight, other than the interlocutor's gaze object.

9 Claims, 7 Drawing Sheets

(56) References Cited

FOREIGN PATENT DOCUMENTS

| JP | 2021-10077 A | 1/2021 |
|----|---|---|
| JP | 6849133 B1 | 3/2021 |
| JP | 2022-132896 A | 9/2022 |
| WO | 2011/027475 A1 | 3/2011 |
| WO | 2017/098999 A1 | 6/2017 |

* cited by examiner

REMOTE DIALOGUE SERVICE THAT CONTROLS DISPLAY OF OBJECTS ON SCREEN

CROSS-REFERENCE TO RELATED APPLICATION

This application claims priority to Japanese Patent Application No. 2022-150732 filed on Sep. 21, 2022, the entire contents of which are incorporated herein by reference.

TECHNICAL FIELD

The present disclosure relates to a method, a non-transitory computer readable medium, and a terminal apparatus.

BACKGROUND

Technology for providing remote dialogue services using communication lines is known. For example, Patent Literature (PTL) 1 discloses a calling system that allows multiple users to talk to each other while viewing images of the others displayed on screens. In the system, the images are modified or changed as if the users look into cameras.

CITATION LIST

Patent Literature

PTL 1: JP 6849133 B1

SUMMARY

There is room for improvement with respect to technology for providing remote dialogue services using communication lines.

It would be helpful to improve technology for providing remote dialogue services using communication lines.

A method according to an embodiment of the present disclosure is a method performed by a terminal apparatus configured to communicate with a server configured to provide a remote dialogue service, the method including:
  displaying, on a screen, a plurality of objects including first objects indicating faces of other users who are interlocutors of a user of the terminal apparatus;
  detecting an object on the screen at which the user is gazing, as the user's gaze object;
  transmitting information indicating the user's gaze object to the server;
  receiving information indicating each interlocutor's gaze object from the server; and
  controlling orientation of each of the first objects and arrangement of the plurality of objects so as to satisfy, on the screen, a first condition that each interlocutor's line of sight is directed to the interlocutor's gaze object, and a second condition that there are no objects, in each interlocutor's line of sight, other than the interlocutor's gaze object.

A non-transitory computer readable medium according to an embodiment of the present disclosure stores a program configured to cause a terminal apparatus to execute operations, the terminal apparatus being configured to communicate with a server configured to provide a remote dialogue service, the operations including:
  displaying, on a screen, a plurality of objects including first objects indicating faces of other users who are interlocutors of a user of the terminal apparatus;
  detecting an object on the screen at which the user is gazing, as the user's gaze object;
  transmitting information indicating the user's gaze object to the server;
  receiving information indicating each interlocutor's gaze object from the server; and
  controlling orientation of each of the first objects and arrangement of the plurality of objects so as to satisfy, on the screen, a first condition that each interlocutor's line of sight is directed to the interlocutor's gaze object, and a second condition that there are no objects, in each interlocutor's the line of sight, other than the interlocutor's gaze object.

A terminal apparatus according to an embodiment of the present disclosure includes:
  a communication interface configured to communicate with a server configured to provide a remote dialogue service;
  a display configured to display a screen;
  a camera configured to generate an image of a face of a user of the terminal apparatus; and
  a controller configured to:
    control the screen to display a plurality of objects including first objects indicating faces of other users who are interlocutors of the user;
    detect, based on the image, an object on the screen at which the user is determined to be gazing, as the user's gaze object;
    transmit information indicating the user's gaze object to the server;
    receive information indicating each interlocutor's gaze object from the server; and
    control orientation of each of the first objects and arrangement of the plurality of objects so as to satisfy, on the screen, a first condition that each interlocutor's line of sight is directed to the interlocutor's gaze object, and a second condition that there are no objects, in each interlocutor's line of sight, other than the interlocutor's gaze object.

According to an embodiment of the present disclosure, technology for providing remote dialogue services using communication lines is improved.

DETAILED DESCRIPTION

Hereinafter, an embodiment of the present disclosure will be described.

Outline of Embodiment

Figure 1:
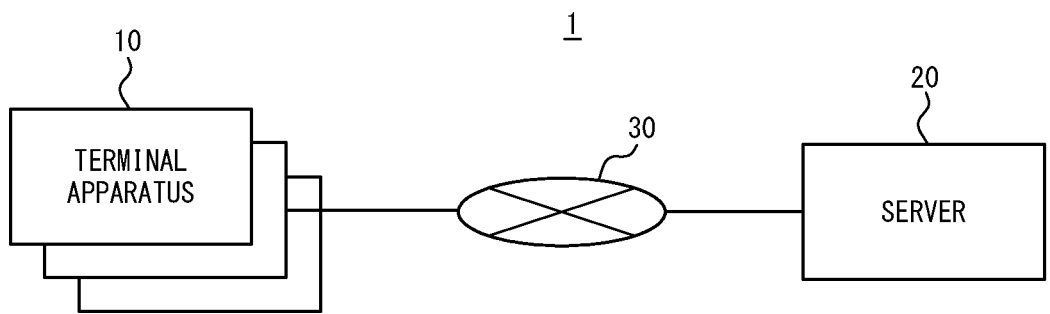
FIG. 1 is a block diagram illustrating a schematic configuration of a system according to an embodiment of the present disclosure.

An outline of a system 1 according to an embodiment of the present disclosure will be described with reference to FIG. 1. The system 1 includes a plurality of terminal apparatuses 10 and a server 20. Each terminal apparatus 10 and the server 20 can communicate with each other via a communication line 30 such as the Internet or a mobile communication network, for example.

The terminal apparatuses 10 are computers, such as personal computers (PCs), smartphones, or tablet terminals, for example. The server 20 is configured to include one computer or a plurality of computers that can communicate with each other. The server 20 provides a remote dialogue service using the communication line 30. In the present embodiment, each user can remotely dialogue with one or more interlocutors using the user's own terminal apparatus 10. In the present embodiment, the user's terminal apparatus 10 provides remote dialogue while displaying an object (hereinafter also referred to as "first object") indicating each interlocutor's face on a screen. In the present embodiment, the first object is a three-dimensional object generated in real time using visible light images and depth images of the face of the interlocutor, and is displayed in conjunction with actual movements of the interlocutor. However, the first object is not limited to this example and may be a three-dimensional object of an avatar, such as a character, for example. Alternatively, the first object may be a two-dimensional object including images of the interlocutor or a character.

In addition to the first object, one or more second objects that are different from the first object may be displayed on the screen. The second object is, for example, but not limited to, a three-dimensional or two-dimensional object including text and/or images. In one example, a shared document or the like in a remote meeting using the remote dialogue service may be displayed on the screen, as the second object.

First, an outline of the present embodiment will be described, and details thereof will be described later. The terminal apparatus 10 displays, on a screen, a plurality of objects including first objects indicating faces of other users who are interlocutors of a user of the terminal apparatus 10, and detects an object on the screen at which the user is gazing, as the user's gaze object. The terminal apparatus 10 transmits information indicating the user's gaze object to the server 20, and receives information indicating each interlocutor's gaze object from the server 20. The terminal apparatus 10 then controls orientation of each first object and arrangement of the plurality of objects so as to satisfy, on the screen, a first condition that each interlocutor's line of sight is directed to the interlocutor's gaze object, and a second condition that there are no objects, in each interlocutor's line of sight, other than the interlocutor's gaze object.

Figure 2:
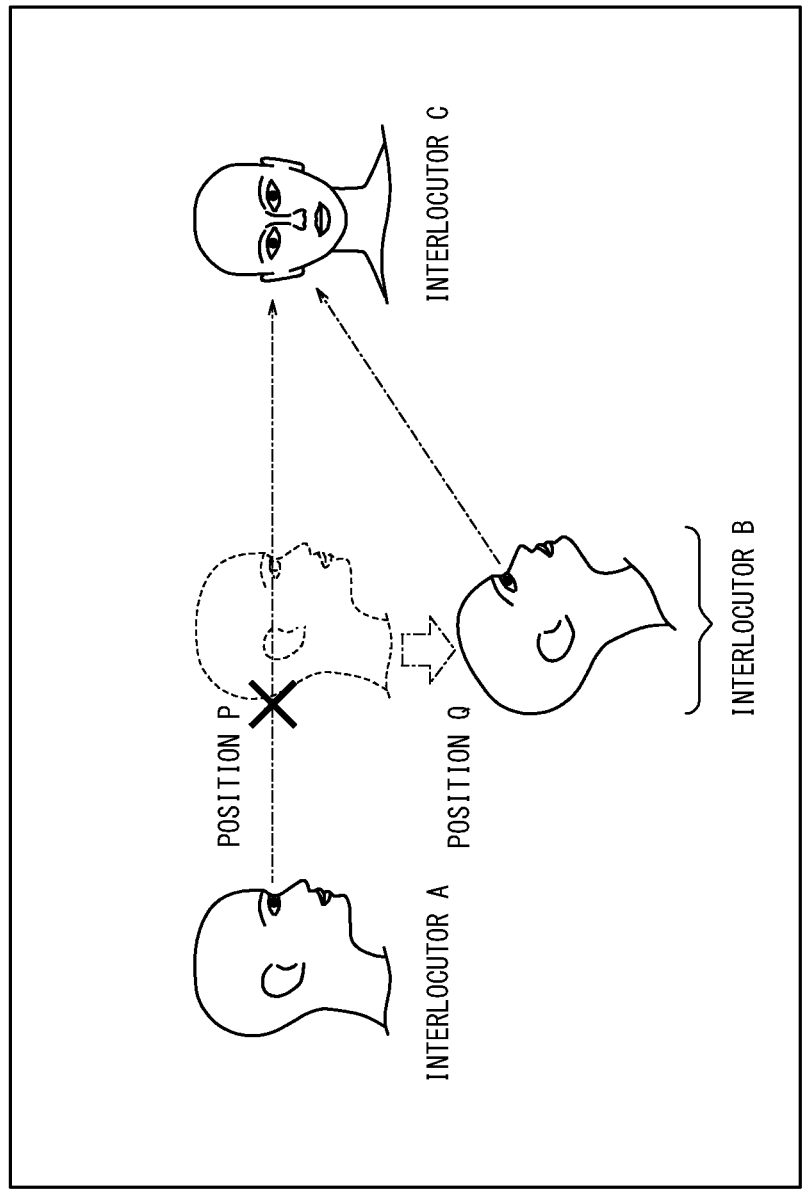
FIG. 2 is a diagram illustrating a first example of a screen displayed on a terminal apparatus.

The control based on the first and second conditions described above will be described with reference to FIG. 2. FIG. 2 illustrates a screen of the terminal apparatus 10 of a user who remotely dialogues with three interlocutors A to C. In the screen, three first objects indicating faces of the respective interlocutors A to C are displayed. In the following description, "a first object of an interlocutor" is also simply referred to as "an interlocutor". Here, assuming that a gaze object of each of the interlocutors A and B is the first object indicating the face of the interlocutor C. In other words, the interlocutors A and B shall be gazing at the interlocutor C that is displayed on screens of the terminal apparatuses 10 of the interlocutors A and B, respectively.

The user's terminal apparatus 10 controls the orientation of the interlocutors A and B on the screen, for example, so that the first condition described above is satisfied (e.g., so that a line of sight of each of the interlocutors A and B is directed to the interlocutor C). Here, if the interlocutor B is present at a position P on the screen, the interlocutor B is present in a line of sight of the interlocutor A. In such a case, the user of the terminal apparatus 10 cannot recognize at a glance which of the interlocutors B and C the interlocutor A is gazing at. According to the present embodiment, the terminal apparatus 10 moves the interlocutor B from the position P to a position Q below, for example, to remove the interlocutor B from the line of sight of the interlocutor A, so that the second condition described above is satisfied (e.g., so that no object other than the interlocutor C is present in the line of sight of the interlocutor A). In such a case, the user of the terminal apparatus 10 can recognize at a glance that the interlocutor A is gazing at the interlocutor C, instead of the interlocutor B. Therefore, according to the present embodiment, technology for providing remote dialogue services using communication lines is improved in that the user can recognize each interlocutor's gaze object at a glance from the screen.

Next, components of the system 1 will be described in detail.

(Configuration of Terminal Apparatus)

Figure 3:
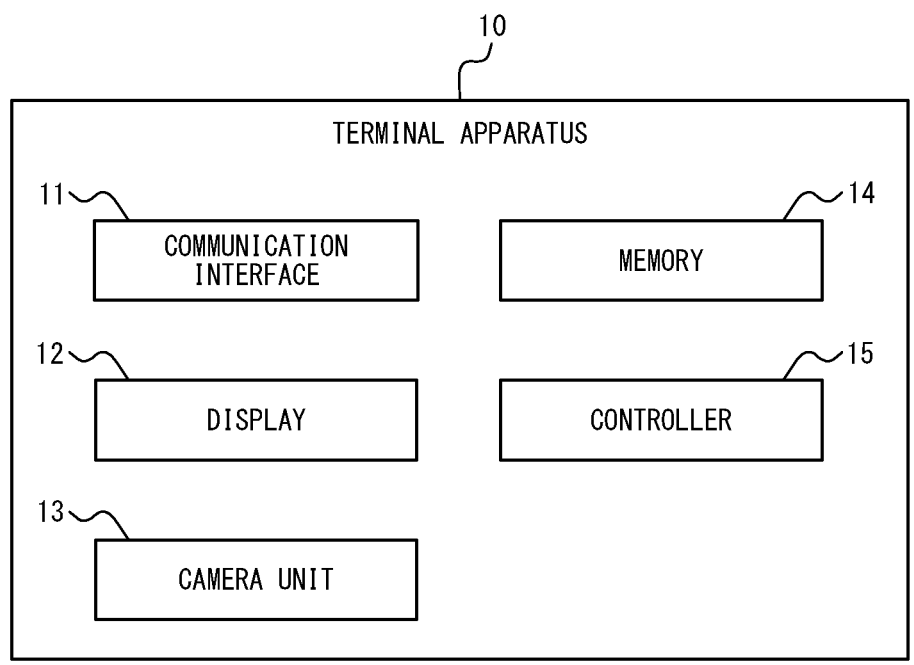
FIG. 3 is a block diagram illustrating a schematic configuration of the terminal apparatus.

As illustrated in FIG. 3, the terminal apparatus 10 includes a communication interface 11, a display 12, a camera unit 13, a memory 14, and a controller 15.

The communication interface 11 includes at least one communication interface for connecting to the communication line 30. The communication interface is compliant with mobile communication standards such as the 4th generation (4G) standard and the 5th generation (5G) standard, a wired local area network (LAN) standard, or a wireless LAN standard, for example, but not limited to these, and may be compliant with any communication standard.

The display 12 includes one or more displays. The display 12 may include an interface to which an external display can be connected.

The camera unit 13 includes one or more pairs of visible light cameras and depth cameras. The camera unit 13 may also include an interface to which an external visible light camera and an external depth camera can be connected. Each pair of visible light camera and depth camera are provided so that a face of a user using the terminal apparatus 10 can be imaged from a predetermined direction. In the present embodiment, the camera unit 13 includes at least one pair of visible light camera and depth camera capable of imaging a front view of the face of the user viewing a screen of the terminal apparatus 10. A visible light image and a depth image obtained from the visible light camera and the depth camera, respectively, are used to generate a first object indicating the user's face. Hereafter, visible light images and depth images obtained from the visible light cameras and the depth cameras, respectively, are also referred to as "camera images".

The memory 14 includes one or more memories. The memories are semiconductor memories, magnetic memories, optical memories, or the like, for example, but are not limited to these. The memories included in the memory 14 may each function as, for example, a main memory, an auxiliary memory, or a cache memory. The memory 14 stores any information to be used for operations of the terminal apparatus 10. For example, the memory 14 may store a system program, an application program, and the like.

The controller 15 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 15 controls the operations of the entire terminal apparatus 10.

(Configuration of Server)

Figure 4:
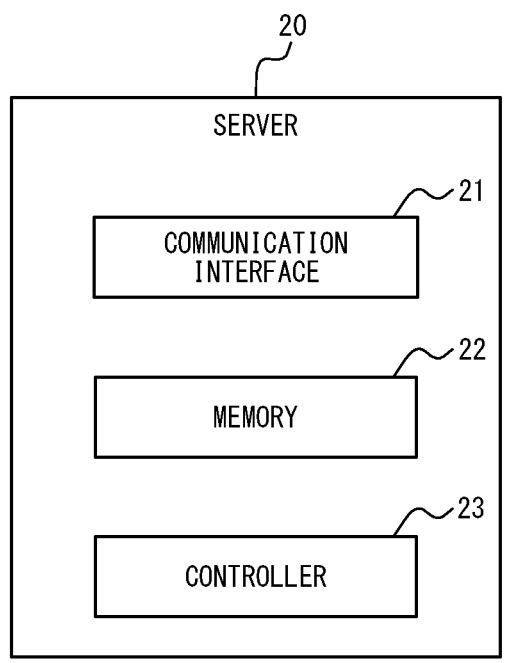
FIG. 4 is a block diagram illustrating a schematic configuration of a server.

As illustrated in FIG. 4, the server 20 includes a communication interface 21, a memory 22, and a controller 23.

The communication interface 21 includes at least one communication interface for connecting to the communication line 30. The communication interface is compliant with, for example, a mobile communication standard, a wired LAN standard, or a wireless LAN standard, but not limited to these, and may be compliant with any communication standard.

The memory 22 includes one or more memories. The memories included in the memory 22 may each function as, for example, a main memory, an auxiliary memory, or a cache memory. The memory 22 stores any information to be used for operations of the server 20. For example, the memory 22 may store a system program, an application program, embedded software, a database, and the like.

The controller 23 includes at least one processor, at least one programmable circuit, at least one dedicated circuit, or a combination of these. The controller 23 controls the operations of the entire server 20.

(Operations of System)

Figure 5:
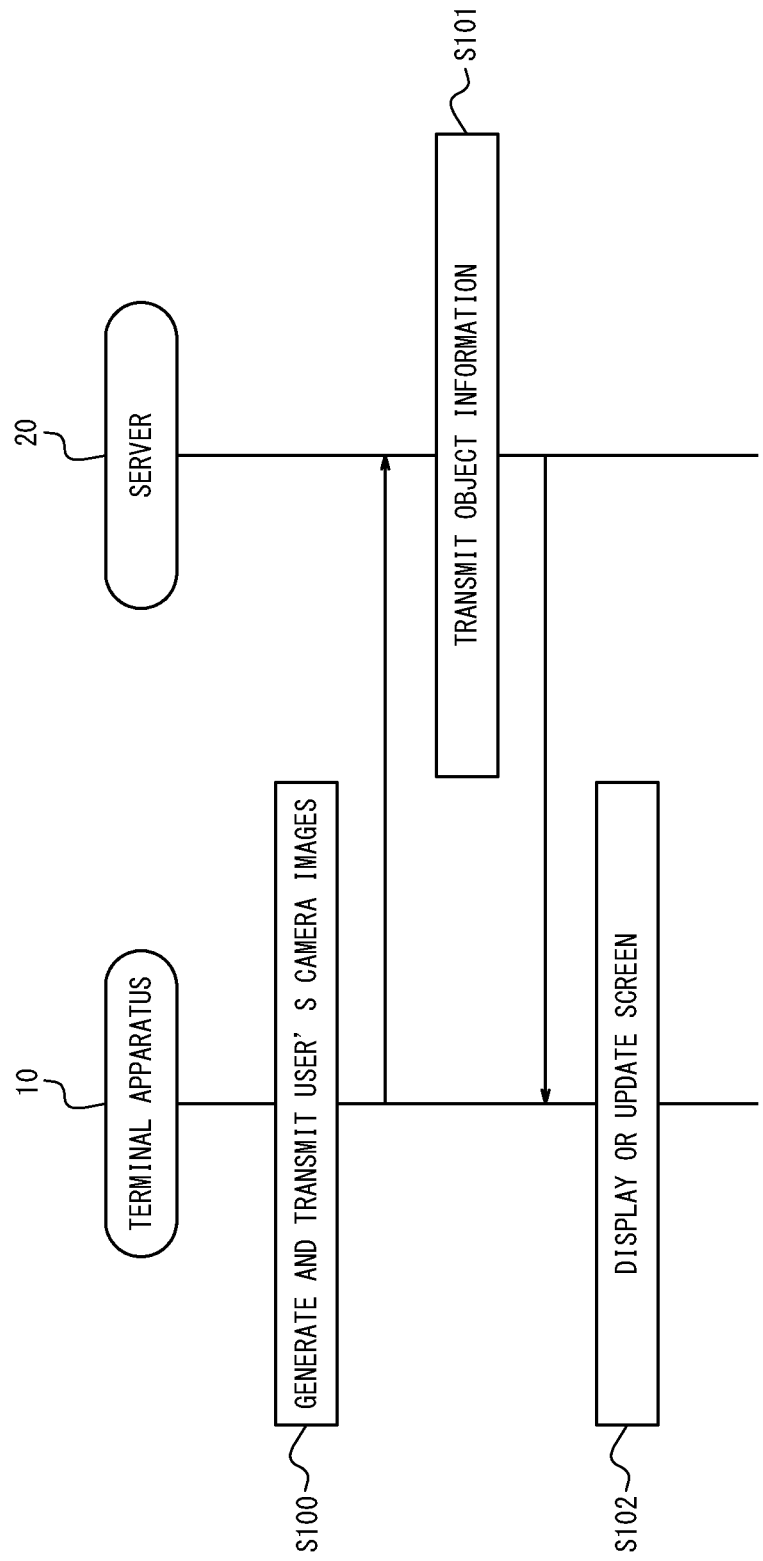
FIG. 5 is a sequence diagram illustrating first operations of the system.

Next, first operations of the system 1 will be described with reference to FIG. 5. In outline, the first operations are operations for generating each first object to be displayed on screens of the terminal apparatuses 10, and are repeated at a predetermined frame rate during remote dialogue. Here describes operations of a user's terminal apparatus 10 and the server 20 in a situation in which the user remotely dialogues with three interlocutors A to C. Operations of each interlocutor's terminal apparatus 10 are the same as those of the user's terminal apparatus 10, so description is omitted.

Step S100: The controller 15 of the user's terminal apparatus 10 generates the user's camera images using the camera unit 13, and transmits the user's camera images to the server 20 via the communication interface 11.

As described above, the camera images include a visible light image and a depth image generated by at least one pair of visible light camera and depth camera included in the camera unit 13. Here, it is assumed that the generated camera images include at least one pair of visible light image and depth image of the user's face captured from the front.

Step S101: The controller 23 of the server 20 generates first object information based on each interlocutor's camera images received from a terminal apparatus 10 of each interlocutor of the user, and transmits the first object information to the user's terminal apparatus 10 via the communication interface 21.

The first object information includes any information to be used for generating each first object, which is to be displayed on a screen of the user's terminal apparatus 10. For example, the first object information may include each interlocutor's camera images as is, or may include data on only a portion corresponding to a person trimmed from each interlocutor's camera images.

When, text and/or images have been received in advance, as a shared document during remote dialogue, for example, from a terminal apparatus 10 of any participant (here, the user or any of the interlocutors A to C) in the remove dialogue, the controller 23 may generate second object information, in addition to the first object information, and transmit the second object information to the user's terminal apparatus 10. The second object information includes any information (e.g., the text and/or images received as the shared document) to be used for generating a second object, which is to be displayed on the screen of the user's terminal apparatus 10.

Step S102: The controller 15 of the terminal apparatus 10 generates first objects indicating faces of the respective interlocutors based on the first object information received from the server 20, and displays the first objects on the screen of the display 12. When receiving the second object information from the server 20, the controller 15 also generates a second object, in addition to the first objects, and displays the second object on the screen of the display 12.

Specifically, when the first object information includes each interlocutor's camera images as is, the controller 15 trims only a portion corresponding to a person from each interlocutor's camera images. The controller 15 generates, from each interlocutor's depth image, a three-dimensional model indicating the shape of the interlocutor's face, and generates a first object indicating the interlocutor's face by texture mapping the interlocutor's visible light image onto the three-dimensional model. The controller 15 then displays the generated first object on the screen of display 12. The controller 15 also generates a second object indicating the text and/or images included in the second object information and displays the second object on the screen of the display 12.

Figure 6:
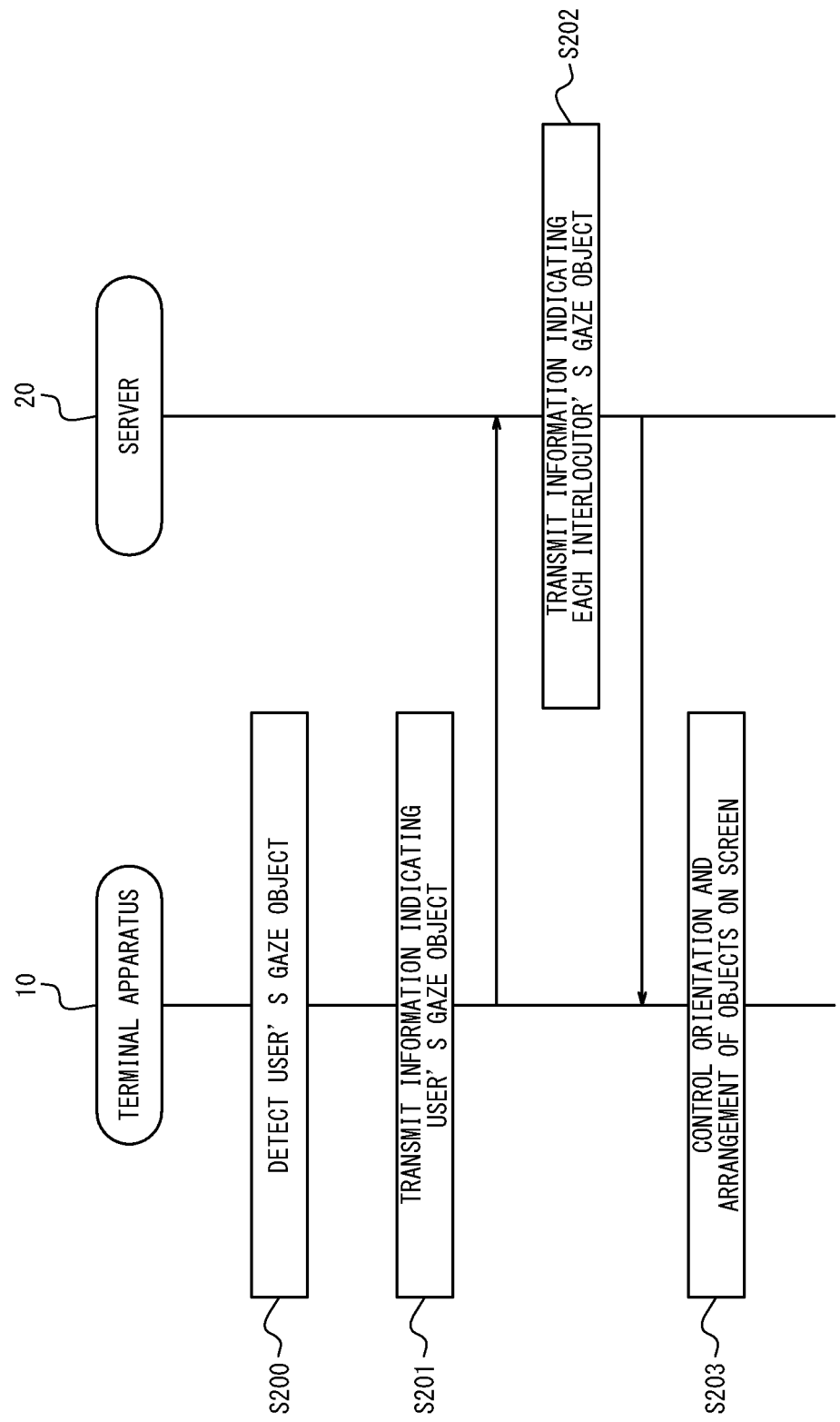
FIG. 6 is a sequence diagram illustrating second operations of the system.

Next, second operations of the system 1 will be described with reference to FIG. 6. In outline, the second operations are operations for controlling the orientation and arrangement of each object on screens of the terminal apparatuses 10, and are performed in parallel with the first operations described above during the remote dialogue. Here describes operations of a user's terminal apparatus 10 and the server 20 in a situation in which the user remotely dialogues with three interlocutors A to C. Operations of each interlocutor's terminal apparatus 10 are the same as those of the user's terminal apparatus 10, so description is omitted.

Step S200: The controller 15 of the user's terminal apparatus 10 detects an object on a screen at which the user is gazing, as the user's gaze object.

Specifically, the controller 15 detects the user's line of sight, based on the camera images of the user's face generated in step S100 of the first operations described above. Any appropriate method can be employed to detect the line of sight. For example, the controller 15 may detect the orientation of the user's face and the positions of the eyes and pupils on the visible light image included in the camera images, by image recognition such as feature point extraction or pattern matching.

The controller 15 then detects the user's line of sight based on the detected orientation of the face and the detected positions of the eyes and pupils. The detected line of sight may be indicated by a three-dimensional vector. The controller 15 then identifies an object on the screen to which the user's line of sight is directed, and detects the object as the user's gaze object. Here, the controller 15 may detect an object, as the user's gaze object, when the user has kept gazing at the object on the screen for a predetermined time. Such a configuration reduces the occurrence of inconvenience that when the user shifts the line of sight for a moment from an object at which the user is gazing, for example, the object is no longer regarded as a gaze object, or a gaze object switches frequently.

Step S201: The controller 15 transmits information indicating the user's gaze object to the server 20 via the communication interface 11.

Step S202: The controller 23 of the server 20 transmits information indicating each interlocutor's gaze object, which is received from a terminal apparatus 10 of each interlocutor of the user, to the user's terminal apparatus via the communication interface 21.

Step S203: The controller 15 of the terminal apparatus 10 controls, on the screen of the display 12, the orientation of each first object and the arrangement of the plurality of objects on the screen so as to satisfy first and second conditions.

As described above, the first condition is a condition in which each interlocutor's line of sight is directed to the interlocutor's gaze object. For example, assume that, among the three interlocutors A to C, a gaze object of each of the interlocutors A and B is the first object of the interlocutor C, and a gaze object of the interlocutor C is the first object of the user. In such a case, the controller 15 controls the orientation of the first object of each of the interlocutors A to C on the screen so that the line of sight of each of the interlocutors A and B is directed to the interlocutor C, and the line of sight of the interlocutor C is directed to the user (specifically, the front of the screen) in order to satisfy the first condition.

As described above, the second condition is a condition in which there are no objects, in each interlocutor's line of sight, other than the interlocutor's gaze object. For example, in the screen illustrated in FIG. 2, when the interlocutor B is present at a position P, there is an object (here, interlocutor B) in the light of sight of the interlocutor A, other than the interlocutor C i.e., the gaze object of the interlocutor A. In such a case, the controller 15 controls the arrangement of the plurality of objects on the screen so as to satisfy the second condition, for example, by moving the interlocutor B from a position P to a position Q below and removing the interlocutor B from the line of sight of the interlocutor A.

Figure 7:
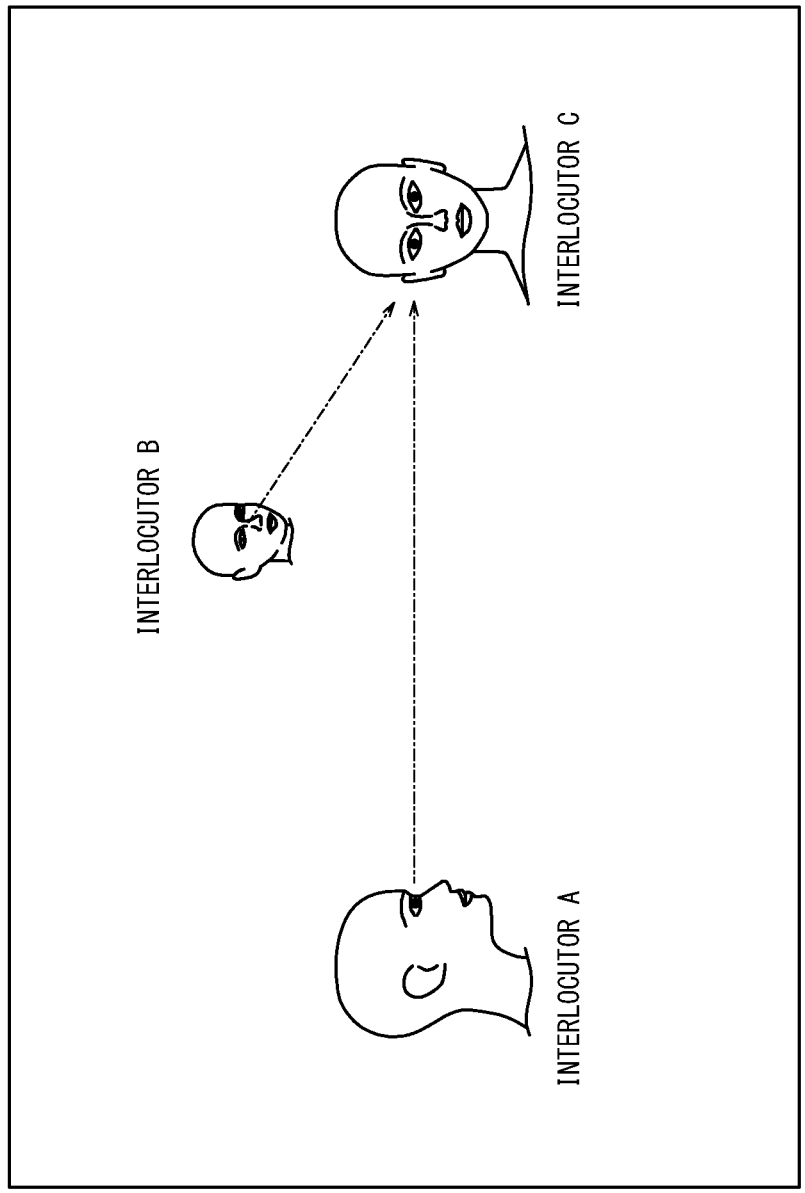
FIG. 7 is a diagram illustrating a second example of the screen displayed on the terminal apparatus.

When controlling the arrangement of the plurality of objects on the screen, the controller 15 may control the arrangement of the plurality of objects so as to satisfy a third condition regarding a total movement amount associated with rearrangement of the plurality of objects on the screen, in addition to the first and second conditions described above. For example, the third condition may be a condition of minimizing a total movement amount of the plurality of objects on the screen due to rearrangement. Such a configuration reduces the occurrence of inconvenience that, for example, rearrangement leads relatively large movement of the user's gaze object, thus resulting in reduction in visibility. The movement amount of each object may be, for example, a movement amount on the screen. Alternatively, when the screen displayed during remote dialogue is a screen indicating a three-dimensional virtual space in which each object is located, the movement amount the object may be a movement amount within the virtual space. For example, a screen illustrated in FIG. 7 is a screen indicating a three-dimensional virtual space in which the first objects of the interlocutors A to C are located, and the interlocutor B is moved toward the back of the screen, in contrast to the screen illustrated in FIG. 2.

As described above, the terminal apparatus 10 according to the present embodiment displays, on a screen, a plurality of objects including first objects indicating faces of other users who are interlocutors of a user of the terminal apparatus 10, and detects an object on the screen at which the user is gazing, as the user's gaze object. The terminal apparatus 10 transmits information indicating the user's gaze object to the server 20, and receives information indicating each interlocutor's gaze object from the server 20. The terminal apparatus 10 then controls orientation of each first object and arrangement of the plurality of objects so as to satisfy, on the screen, a first condition that each interlocutor's line of sight is directed to the interlocutor's gaze object, and a second condition that there are no objects, in each interlocutor's line of sight, other than the interlocutor's gaze object.

According to such a configuration, on the screen of the user's terminal apparatus 10, each interlocutor's line of sight is directed to the interlocutor's gaze object without being interrupted. Therefore, technology for providing remote dialogue services using communication lines is improved in that the user can recognize each interlocutor's gaze object at a glance from the screen.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which the configurations and operations of the terminal apparatuses 10 and the server 20 in the above embodiment are distributed to multiple computers capable of communicating with each other can be implemented. For example, an embodiment in which operations of one of the terminal apparatus 10 and the server 20 may be executed by the other can be implemented. For example, in the embodiment described above, the terminal apparatus 10 performs the process of generating objects to be displayed on a screen of the terminal apparatus 10 (step S102) and the process of controlling the orientation of each first object and the arrangement of the plurality of objects on the screen of the terminal apparatus (step S203). However, the server 20 may perform such processes, and transmit processing results to the terminal apparatus 10.

For example, an embodiment in which a general purpose computer functions as the terminal apparatus 10 or the server 20 according to the above embodiment can also be implemented. Specifically, a program in which processes for realizing the functions of the terminal apparatus 10 or the server according to the above embodiment are written may be stored in a memory of a general purpose computer, and the program may be read and executed by a processor. Accordingly, the present disclosure can also be implemented as a program executable by a processor, or a non-transitory computer readable medium storing the program.

Examples of some embodiments of the present disclosure are described below. However, it should be noted that the embodiments of the present disclosure are not limited to these examples.

[Appendix 1] A method performed by a terminal apparatus configured to communicate with a server configured to provide a remote dialogue service, the method comprising:

displaying, on a screen, a plurality of objects including first objects indicating faces of other users who are interlocutors of a user of the terminal apparatus;

detecting an object on the screen at which the user is gazing, as the user's gaze object;

transmitting information indicating the user's gaze object to the server;

receiving information indicating each interlocutor's gaze object from the server; and controlling orientation of each of the first objects and arrangement of the plurality of objects so as to satisfy, on the screen, a first condition that each interlocutor's line of sight is directed to the interlocutor's gaze object, and a second condition that there are no objects, in each interlocutor's line of sight, other than the interlocutor's gaze object.

[Appendix 2] The method according to appendix 1, wherein when controlling the arrangement of the plurality of objects, the terminal apparatus is configured to control the arrangement of the plurality of objects so as to satisfy the first condition, the second condition, and a third condition regarding a total movement amount associated with rearrangement of the plurality of objects.

[Appendix 3] The method according to appendix 2, wherein the third condition is a condition of minimizing the total movement amount of the plurality of objects due to the rearrangement.

[Appendix 4] The method according to any one of appendices 1 to 3, wherein when detecting the user's gaze object, the terminal apparatus detects, as the user's gaze object, an object on the screen at which the user has kept gazing for a predetermined time.

[Appendix 5] The method according to any one of appendices 1 to 4, wherein the plurality of objects includes the first objects indicating the faces of the other users being the interlocutors and a second object indicating text and/or an image.

[Appendix 6] A program configured to cause a terminal apparatus to execute operations, the terminal apparatus being configured to communicate with a server configured to provide a remote dialogue service, the operations comprising:

displaying, on a screen, a plurality of objects including first objects indicating faces of other users who are interlocutors of a user of the terminal apparatus;

detecting an object on the screen at which the user is gazing, as the user's gaze object;

transmitting information indicating the user's gaze object to the server;

receiving information indicating each interlocutor's gaze object from the server; and controlling orientation of each of the first objects and arrangement of the plurality of objects so as to satisfy, on the screen, a first condition that each interlocutor's line of sight is directed to the interlocutor's gaze object, and a second condition that there are no objects, in each interlocutor's line of sight, other than the interlocutor's gaze object.

[Appendix 7] A terminal apparatus comprising:

a communication interface configured to communicate with a server configured to provide a remote dialogue service;

a display configured to display a screen;

a camera configured to generate an image of a face of a user of the terminal apparatus; and a controller configured to:

control the screen to display a plurality of objects including first objects indicating faces of other users who are interlocutors of the user;

detect, based on the image, an object on the screen at which the user is determined to be gazing, as the user's gaze object;

transmit information indicating the user's gaze object to the server;

receive information indicating each interlocutor's gaze object from the server; and control orientation of each of the first objects and arrangement of the plurality of objects so as to satisfy, on the screen, a first condition that each interlocutor's line of sight is directed to the interlocutor's gaze object, and a second condition that there are no objects, in each interlocutor's line of sight, other than the interlocutor's gaze object.

The invention claimed is:

1. A method performed by a terminal apparatus configured to communicate with a server configured to provide a remote dialogue service, the method comprising:

displaying, on a screen of the terminal apparatus, a plurality of objects including first objects indicating faces of other users who are interlocutors of a user of the terminal apparatus;

detecting an object, among the plurality of objects on the screen, at which the user is gazing, as the user's gaze object;

transmitting information indicating the user's gaze object to the server;

receiving, from the server, information indicating an object, among the plurality of objects on the screen, at which each of the interlocutors is gazing, as the interlocutor's gaze object; and controlling orientation of each of the first objects and arrangement of the plurality of objects so as to satisfy, on the screen of the terminal apparatus, both conditions including: a first condition that each of the interlocutor's line of sight is directed to the interlocutor's gaze object on the screen of the terminal apparatus, and at the same time, a second condition that there are no objects, in each interlocutor's line of sight, other than the interlocutor's gaze object, wherein each interlocutor's line of sight is from the face of the interlocutor to the interlocutor's gaze object on the screen of the terminal apparatus of the user.

2. The method according to claim 1, wherein when controlling the arrangement of the plurality of objects, the terminal apparatus is configured to control the arrangement of the plurality of objects so as to satisfy the first condition, the second condition, and a third condition regarding a total movement amount associated with rearrangement of the plurality of objects.

3. The method according to claim 2, wherein the third condition is a condition of minimizing the total movement amount of the plurality of objects due to the rearrangement.

4. The method according to claim 1, further comprising:

during the remote dialogue service, capturing images of the user of the terminal apparatus using at least one camera of the terminal apparatus, wherein the camera images include a visible light image and a depth image generated by the at least one camera, and the user's gaze is determined based on the captured camera images, and wherein when detecting the user's gaze object, the terminal apparatus detects, as the user's gaze object, an object on the screen at which the user has kept gazing for a predetermined time.

5. The method according to claim 1, wherein the plurality of objects includes the first objects indicating the faces of the other users being the interlocutors and a second object indicating text and/or an image.

6. A non-transitory computer readable medium storing a program configured to cause a terminal apparatus to execute operations, the terminal apparatus being configured to communicate with a server configured to provide a remote dialogue service, the operations comprising:
displaying, on a screen of the terminal apparatus, a plurality of objects including first objects indicating faces of other users who are interlocutors of a user of the terminal apparatus;
detecting an object, among the plurality of objects on the screen, at which the user is gazing, as the user's gaze object;
transmitting information indicating the user's gaze object to the server;
receiving, from the server, information indicating an object, among the plurality of objects on the screen, at which each of the interlocutors is gazing, as the interlocutor's gaze object; and
controlling orientation of each of the first objects and arrangement of the plurality of objects so as to satisfy, on the screen of the terminal apparatus, both conditions including: a first condition that each of the interlocutor's line of sight is directed to the interlocutor's gaze object on the screen of the terminal apparatus, and at the same time, a second condition that there are no objects, in each interlocutor's line of sight, other than the interlocutor's gaze object, wherein each interlocutor's line of sight is from the face of the interlocutor to the interlocutor's gaze object on the screen of the terminal apparatus of the user.

7. A terminal apparatus comprising:
a communication interface configured to communicate with a server configured to provide a remote dialogue service;
a display configured to display a screen of the terminal apparatus;
a camera configured to generate an image of a face of a user of the terminal apparatus; and
a controller configured to:
control the screen to display a plurality of objects including first objects indicating faces of other users who are interlocutors of the user;
detect, based on the image, an object among the plurality of objects on the screen at which the user is determined to be gazing, as the user's gaze object;
transmit information indicating the user's gaze object to the server;
receive, from the server, information indicating an object, among the plurality of objects on the screen, at which each of the interlocutors is gazing, as the interlocutor's gaze object; and
control orientation of each of the first objects and arrangement of the plurality of objects so as to satisfy, on the screen of the terminal apparatus, both conditions including: a first condition that each of the interlocutor's line of sight is directed to the interlocutor's gaze object on the screen of the terminal apparatus, and at the same time, a second condition that there are no objects, in each interlocutor's line of sight, other than the interlocutor's gaze object, wherein each interlocutor's line of sight is from the face of the interlocutor to the interlocutor's gaze object on the screen of the terminal apparatus of the user.

8. The method according to claim 4, wherein the first objects indicating the faces of the other users being the interlocutors are obtained from images that are captured from cameras of terminals.

9. The method according to claim 1, wherein the controlling comprises:
in a case that first and second interlocutors among the interlocutors are gazing at a same object among the plurality of objects on the screen of the terminal apparatus and that the second interlocutor is present in the first interlocutor's line of sight on the screen of the terminal apparatus, removing the second interlocutor from the first interlocutor's line of sight by moving a position of the second interlocutor on the screen of the terminal apparatus so that no object other than the same object is present in the first interlocutor's line of sight and that the first and second interlocutors are gazing at the same object after the removing.

* * * * *